(12) United States Patent
Gilbey et al.

(10) Patent No.: US 10,970,711 B2
(45) Date of Patent: Apr. 6, 2021

(54) TRANSACTION SYSTEM AND METHOD

(71) Applicant: MASTERCARD ASIA/PACIFIC PTE. LTD., Singapore (SG)

(72) Inventors: Benjamin Charles Gilbey, Singapore (SG); Sunitha Miryala, Singapore (SG); Rajat Maheshwari, Singapore (SG)

(73) Assignee: Mastercard Asia/Pacific PTE. LTD., Singapore (SG)

( * ) Notice: Subject to any disclaimer, the term of this patent is extended or adjusted under 35 U.S.C. 154(b) by 345 days.

(21) Appl. No.: 15/944,861

(22) Filed: Apr. 4, 2018

(65) Prior Publication Data

US 2018/0285861 A1    Oct. 4, 2018

(51) Int. Cl.
| | |
|---|---|
| *G06Q 40/00* | (2012.01) |
| *G06Q 20/34* | (2012.01) |
| *G10L 19/16* | (2013.01) |
| *G06Q 20/36* | (2012.01) |
| *G06Q 20/32* | (2012.01) |

(52) U.S. Cl.
CPC ......... *G06Q 20/351* (2013.01); *G06Q 20/325* (2013.01); *G06Q 20/3272* (2013.01); *G06Q 20/36* (2013.01); *G10L 19/167* (2013.01)

(58) Field of Classification Search
CPC ........................................................ G06Q 40/00
USPC ............................................................. 705/41
See application file for complete search history.

(56) References Cited

U.S. PATENT DOCUMENTS 9,710,804 B2 * 7/2017 Zhou ..................... G06Q 30/02

* cited by examiner

*Primary Examiner* — Ojo O Oyebisi
(74) *Attorney, Agent, or Firm* — Pramudji Law Group PLLC; Ari Pramudji

(57) ABSTRACT

System for performing a transaction between payer and payee, including a payee client device, a payer client device, and one or more payment processing devices, wherein a payer payment application executed by the payer client device: determines virtual payment card data indicative of a virtual payment card indicative of a payer account; determines encoded virtual payment card data by encoding the virtual payment card data at least in part using an audio encoding scheme; transmits an indication of the encoded virtual payment card data to the payee client device via an audio communications channel; a payee payment application executed by the payee client device: causes decoding of the encoded virtual payment card data to determine decoded virtual payment card data; causes the one or more payment processing devices to selectively perform the transaction using the payer account at least partially in accordance with the decoded virtual payment card data.

16 Claims, 8 Drawing Sheets

TRANSACTION SYSTEM AND METHOD

CROSS-REFERENCE TO RELATED APPLICATIONS

This application claims the priority benefit of Singapore Application Serial No. 10201702768X, filed Apr. 4, 2017, which is incorporated herein by reference in its entirety.

BACKGROUND OF THE INVENTION

The present invention relates to a system and method for performing a transaction, and in a particular example, performing a transaction using a telephone.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

It is known for merchants to request that consumers disclose payment details over the telephone, for example, to purchase goods, pay for services, make reservations, settle bill payments, and the like. However, there are risks associated with disclosing credit or debit card details over the phone, as the details may be fraudulently used by merchant staff following the conversation, or acquired and used by a third party via recordings of the conversation or eavesdropping on the consumer if details are spoken in a public place. In some instances, a touch tone keypad may be used by the consumer to enter credit card details, however, such a process is time-consuming and can be prone to consumer error.

The use of payment applications, such as mobile wallets, enable payments to be made using an account linked to the payment application, such as a credit card account, bank account, or the like. In these situations, it may be possible for the payment application to issue a virtual card or one-time usage card, which can decrease the incidence of fraud. However, the details of the virtual card still need to be conveyed by the consumer over the telephone, and this takes additional time during which a consumer may unwittingly introduce errors.

SUMMARY OF THE PRESENT INVENTION

The present invention seeks to ameliorate one or more of the problems associated with the prior art.

In a first broad form the present invention seeks to provide a system for performing a transaction between a payer and a payee, the system including a payee client device, a payer client device, and one or more payment processing devices, wherein:
  a) a payer payment application executed by the payer client device is configured to:
    i) determines virtual payment card data indicative of a virtual payment card indicative of a payer account;
    ii) determines encoded virtual payment card data by encoding the virtual payment card data at least in part using an audio encoding scheme; and,
    iii) transmits an indication of the encoded virtual payment card data to the payee client device via an audio communications channel; and,
  b) a payee payment application executed by the payee client device is configured to:
    i) causes decoding of the encoded virtual payment card data to determine decoded virtual payment card data; and,
    ii) causes the one or more payment processing devices to selectively perform the transaction using the payer account at least partially in accordance with the decoded virtual payment card data.

In a second broad form the present invention seeks to provide a method for performing a transaction between a payer and a payee, the method including in a system including a payee client device, a payer client device and one or more payment processing devices:
  a) in a payer payment application executed by the payer client device:
    i) determining virtual payment card data indicative of a virtual payment card indicative of a payer account;
    ii) determining encoded virtual payment card data by encoding the virtual payment card data at least in part using an audio encoding scheme; and,
    iii) transmitting an indication of the encoded virtual payment card data to the payee client device via an audio communications channel; and,
  b) in a payee payment application executed by the payee client device:
    i) causing decoding of the encoded virtual payment card data to determine decoded virtual payment card data; and,
    ii) causing the one or more payment processing devices to selectively perform the transaction using the payer account at least partially in accordance with the decoded virtual payment card data.

In a third broad form the present invention seeks to provide a system for use in performing a transaction between a payee and a payer, the system including a payer payment application executed by a payer client device to:
  a) determine virtual payment card data indicative of a virtual payment card indicative of a payer account;
  b) determine encoded virtual payment card data by encoding the virtual payment card data at least in part using an audio encoding scheme; and,
  c) transmit an indication of the encoded virtual payment card data to the payee client device via an audio communications channel.

In a fourth broad form the present invention seeks to provide a method for use in performing a transaction between a payee and a payer, the method including, in a payer payment application executed by a payer client device:
  a) determining virtual payment card data indicative of a virtual payment card indicative of a payer account;
  b) determining encoded virtual payment card data by encoding the virtual payment card data at least in part using an audio encoding scheme; and,
  c) transmitting an indication of the encoded virtual payment card data to the payee client device via an audio communications channel.

In a fifth broad form, the present invention seeks to provide a non-transitory computer readable storage medium embodying thereon a program of computer readable instructions which, when executed by one or more processors of a payer client device in communication with at least one payee device, cause the payer device to carry out a method for performing a transaction between a payee and a payer, the method embodying the steps of:

a) determining virtual payment card data indicative of a virtual payment card indicative of a payer account;
b) determining encoded virtual payment card data by encoding the virtual payment card data at least in part using an audio encoding scheme; and,
c) transmitting an indication of the encoded virtual payment card data to the payee client device via an audio communications channel.

BRIEF DESCRIPTION OF THE DRAWINGS

An example of the present invention will now be described with reference to the accompanying drawings, in which:—

DETAILED DESCRIPTION OF THE PREFERRED EMBODIMENTS

Figure 1:
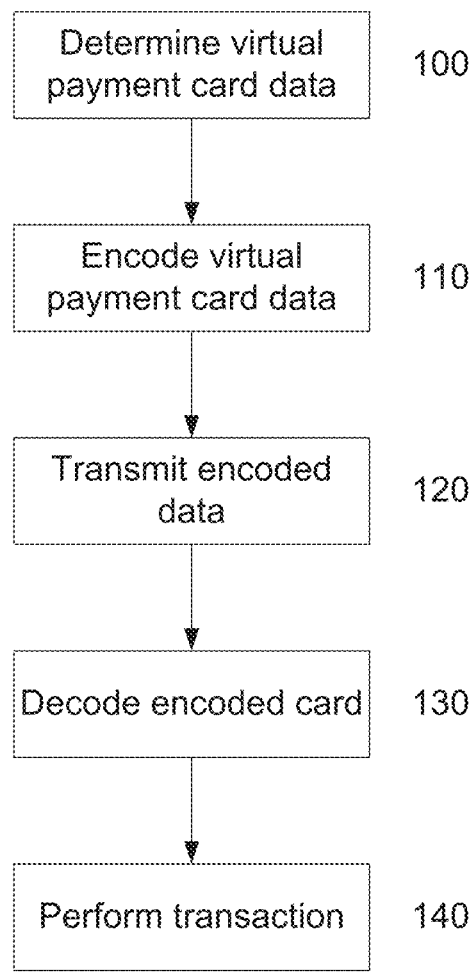
FIG. 1 is a flowchart of a first example of a method for performing a transaction.

An example of a method for performing a transaction will now be described with reference to FIG. 1.

For the purpose of these examples, it is assumed that the transactions are performed in part utilising one or more client devices that in use interact with one or more payment processing devices. The payment processing device(s) are typically part of one or more processing systems, such as one or more servers, and may form part of a payment network backend, or similar. For the following description, reference will generally be made to a single payment processing device, but it will be appreciated that the functionality performed by the payment processing device could in practice be distributed across multiple processing devices and reference to a single device is not intended to be limiting.

In a first example described with reference to FIG. 1, a transaction is performed between a payee and a payer each having a respective client device, hereinafter referred to as payer and payee client devices respectively.

The payer client device is typically a suitably programmed mobile communications device, such as a mobile phone, tablet, or the like, which can be connected to the payment processing device(s) via a communications network. The payer client devices typically execute payer payment applications, such as a mobile or digital wallet, a merchant payment application, or the like, depending on the preferred implementation.

The payee client device can be any form of device capable of being used in a transaction, may or may not incorporate a telephone, and could include a POS (Point of Sales) terminal, payment terminal, a suitably enabled merchant user device, for example a tablet or mobile phone incorporating a payee payment application. The term "payee payment application" in the context of this disclosure may represent any suitable software operating on a payee client device including but not limited to a mobile application or "App", a decoding application, such as a DTMF application, or the like. The payee client device can typically be connected to the payment processing device(s) via a communications network.

It will however be appreciated that a wide range of different devices could be used and the examples given are for the purpose of illustration only.

In this example, at step 100 the payer payment application executed by the payer client device determines virtual payment card data indicative of a virtual payment card indicative of a payer account. A "virtual payment card" in the context of this disclosure may represent an existing plastic card (e.g. debit, credit, rewards card) that has been digitised and tokenized by adding it to a digital or mobile wallet. As used herein, "tokenization" refers to the process of replacing sensitive information, such as a primary account number (PAN) or other financial account details, with a substitute value, and the substitute value is called a "token". Typically, the token will be restricted to use in specific environments (such as a specific mobile device or for transactions with a specific merchant) or for a limited time period or number of uses (including single use). Thus, when stored in a digital wallet, a virtual payment card may be (but need not be) a single-use token or a persistent token.

Alternatively, a virtual payment card may be created when a new payment card is issued electronically by one or more payment processing devices to a digital wallet of the user. Moreover, virtual payment card data may include any suitable data which is indicative of the virtual payment card and may include an alphanumeric, character or numeric representation of the virtual payment card, such as a virtual payment card number or string, or a reference to the virtual payment card, or the like.

At step 110, the payer payment application determines encoded virtual payment card data by encoding the virtual payment card data at least in part using an audio encoding scheme. An "audio encoding scheme" in the context of this disclosure typically represents a method for encoding digital data into transmittable audio data. This may be achieved in any suitable manner, for example, where the virtual payment card data is encoded as a sequence of tones, and/or by associating or modulating one or more signal frequencies and/or amplitudes in respect the virtual payment card data. In one particular example, the audio encoding scheme includes dual tone multi-frequency signalling (DTMF), however in other examples the audio encoding scheme may include audio frequency shift keying (AFSK), or any other suitable scheme.

The payer payment application transmits an indication of the encoded virtual payment card data to the payee client device via an audio communications channel, at step 120. This may be achieved in any number of manners, and typically includes communication via a communication network capable of audio communication such as telephone network between the payee and payer client devices including a landline telephone network, plain old telephone service (POTS), mobile or cellular network, internet-based network, or the like. In other examples, communication may include a point-to-point communications channel between the payee and payer client devices, such as a Bluetooth, NFC (Near Field Communications) channel, or the like. In some instances, communication may include multiple communication networks, for example, in communications between a mobile client device and a landline client device.

At step 130, the method includes, in a payee payment application executed by the payee client device, causing decoding of the encoded virtual payment card data to determine decoded virtual payment card data. This is achievable in any suitable manner, for example, using recognition or decoding algorithms associated with the audio encoding scheme, implemented in software, firmware and/or hardware. For example, decoding may be achieved using the Goertzel algorithm, an analog-to-digital converter (ADC), one or more filters, or the like, depending upon the audio encoding scheme used. Moreover, decoding may be achieved by, for example, the payee payment application decoding the encoded virtual payment card data, or by providing the encoded virtual payment card data to the one or more payment processing devices for decoding, as described below.

The payee payment application causes the one or more payment processing devices to selectively perform the transaction using the payer account at least partially in accordance with the decoded virtual payment card data at step 140. Typically, the one or more payment processing devices includes payment servers that provide payment processing functionality, and in one example provide payment network functionality including communicating with acquirer processing systems or issuer processing systems as required in order to perform transactions. This will be described in further detail below.

Accordingly, the above described process enables a transaction to be performed whilst, for example, a payer is on the telephone to a payee. Additionally, it will be appreciated that the payee and payer could be any form of entity and could be individuals, companies, corporations or the like, allowing transactions to be performed in a private and/or commercial environment, including allowing for transactions between a customer and a merchant, or the like.

This system and method is particularly advantageous as audio encoding provides additional security in relation to payment details and mitigates the risk that the payer, or a third party accessing the payee's records or overhearing the payer, can acquire the payment details and fraudulently access a payer's account. Beneficially, the audio encoding typically provides an easily decodable medium for safe transmission of payment details.

Additionally, as the payer payment application determines and transmits the encoded virtual payment card data via an audio communication channel, this obviates the need for the payer to manually key in or read out payment details. This decreases the opportunity for error, provides a better payer experience, and decreases call handling time as payment details do not have to be 'read back' or otherwise manually confirmed.

A number of further features will now be described.

In one example, determining the virtual payment card data at step 100 includes any one of requesting the virtual payment card data from the one or more payment processing devices, as discussed in further detail below, or retrieving the virtual payment card data from a store, and/or generating the virtual payment card data in accordance with user input commands. Retrieving from a store may include, for example, accessing a database, digital or mobile wallet, or other memory store in order to retrieve previously generated or predetermined virtual payment card data. Alternatively, a user may input payment or account details, for example, using a keypad or capturing an image of a payment card, such that the virtual payment card data is generated using the inputted details or captured image.

In some examples, the payer payment application includes a digital wallet application, also referred to as a mobile wallet application. The digital wallet application typically refers to an electronic application which allows a payer to make electronic transactions, for example using their computer, processing system, smartphone or the like. In addition to storing payment details, the digital wallet may also include payer identity credentials, payer loyalty or rewards accounts/cards, shipping information, or the like, which may be available for communication to the payee client device and/or payment processing devices, as appropriate. The payment details may be stored in a secure element of a mobile device, or alternatively may be stored securely in a cloud computing environment, in a system known as Host Card Emulation (HCE). Digital wallet applications may include MasterPass™, Android Pay™, Apple Pay, Samsung Pay, Microsoft Wallet, or the like. Utilising a digital wallet application is beneficial as it allows a user to perform transactions without requiring them to maintain one or more physical payment cards. This ensures a user is able to perform the transaction quickly, easily and securely.

In one example, determining the virtual payment card data includes, in the payer payment application, generating a virtual payment card request, the virtual payment card request indicative of an identity of the payer and/or an identity of the payer account. Additionally, the payer payment application provides the virtual payment card request to the one or more payment processing devices via a communication network.

The one or more payment processing devices is responsive to the virtual payment card request to generate the virtual payment card data which is indicative of the virtual payment card in accordance with the virtual payment card request, and to provide an indication of the virtual payment card data to the payer payment application via the communication network. Generating a virtual payment card, and accordingly virtual payment card data, may be achieved in any suitable manner, and in some examples includes generating a random, or pseudo-random, number associated with the payer's account. In some instances, the virtual payment card may be referred to as a virtual credit card, a virtual account number, or the like. In any event, as methods for generating a virtual payment card are known, they will not be described in further detail here.

In one example, the virtual payment card request is encrypted by the payer payment application. Encryption may be achieved in any appropriate manner but in one example includes the payer payment application encrypting the virtual payment card request using a public key of a public/private key pair of the payment processing device, thereby ensuring that only the payment processing device is able to decrypt the virtual payment card request and thereby recover the request details, such as payer identity or payer account identity. This avoids the content of the virtual payment card request being viewed by either the payee or any other third party, for example in an attempt to obtain details of the payer's account, authentication information or the like. It will also be appreciated however that other encryption techniques could additionally or alternatively be used. For example, the virtual payment card request could be encrypted using a symmetric one time encryption key, or the like. The virtual payment card request could also be digitally signed using a private key of the payer payment application, allowing the payment processing device to validate the source of the virtual payment card request.

It will be appreciated that a similar process can be performed in respect of the indication of the virtual payment card data, for example, the payment processing device encrypts the indication of the virtual payment card data. Again, this can be performed in a similar manner for similar reasons, and this will not therefore be described in any further detail.

Additionally or alternatively, the virtual payment card may be valid one or more of:
- a single transaction;
- a predetermined transaction amount;
- the transaction amount;
- a predetermined number of transactions;
- a predetermined period of time; and,
- a period ending at a predetermined date/time.

Constraining the validity of the virtual payment card may provide additional security, mitigating the risk that the payer account associated with the virtual payment card is fraudulently debited. Typically, the virtual payment card is valid for a single transaction, therefore ensuring that in the event a third party does obtain details of the virtual payment card, they are unable to process any further payments.

In a further example, causing decoding of the encoded virtual payment card data includes, in a payee payment application decoding the encoded virtual payment card data, or, causing the one or more payment processing devices to decode the encoded virtual payment card data. In this regard, it will be appreciated that decoding may be performed by either the payee payment application, or by the one or more payment processing devices. For example, the payee payment application may simply forward an indication of the encoded virtual payment card data to the payment processing device to thereby request the payment processing devices decode the payment card and perform the transaction. This has the advantage that the decoded payment card details are available only to a trusted party such as a token service provider or the issuer of the card. However, in another example, the payee payment application decodes the card and requests the one or more payment processing devices perform the transaction using the decoded virtual card.

In a further example, the payee payment application generates a payment transaction request, the payment transaction request including an indication of the decoded virtual payment card data, the decoded virtual payment card data being indicative of at least the payer account, a transaction amount and a payee identifier indicative of a payee account. Additionally, the payee payment application provides the payment transaction request to the one or more payment processing devices via a communication network. The one or more payment processing devices are responsive to the payment transaction request to cause the payer account to be debited in accordance the payment transaction request, cause the payee account to be credited in accordance the payment transaction request, generate a transaction payment notification indicative of the results of the transaction, and provide the transaction payment notification to the payer payment application and/or the payee payment application.

In this regard, the payment processing device typically forms part of a payment network utilised in order to connect acquirers and/or issuers, in which case the payment processing device typically at least partially causes the transaction to be performed, for example by transferring transaction data and/or other messages between the issuer and acquirer in accordance with standard transaction processes. However, it will be appreciated that the transaction process can be implemented as part of any backend payment system, and the example described is not intended to be limiting.

In any event, the payee payment application may display an indication of the results of the transaction via a payee display associated with the payee client device. Additionally or alternatively the payer payment application may display an indication of the results of the transaction via a payer display associated with the payer client device. In this regard, the payee and/or payer receive an indication of whether or not the transaction was successful, optionally together with any other suitable information such as an updated account balance, or the like. This is particularly beneficial as it provides the payee and/or payer with, for example, immediate confirmation of the success of a transaction, including enabling them to retry an unsuccessful transaction, if appropriate.

In a further example, the payee and payer client devices communicate to determine transaction details including at least a transaction amount. This can be achieved in any one of a number of manners, for example, transaction details entered into the payee or payer client device could be shared with the other client device via one or more communication networks, such as the Internet. The transaction details may also include any other additional information required to perform the transaction, including but not limited to information regarding the payee or payer, such as a name or other identifier. Alternatively this may be achieved manually, for example by having the payee and payer manually discuss the transaction details, such as the transaction amount, and having the payee manually enter the transaction details, for example, via user input commands.

In one example, the payee payment application generates a payer transaction request, the payer transaction request being indicative of payer transaction details including a transaction identity, a transaction reference, and/or a payee identity. Additionally, the payee payment application provides the payer transaction request to the payer payment application via a communication network. In some examples, the payer transaction details may include the transaction amount, or any other suitable information.

Accordingly, the payer payment application is responsive to display a payment request indication indicative of at least some of the payer transaction details, determine user selection of a payment request option in accordance with user input commands, and determine the virtual payment card data in accordance with the payment request option. Thus, in some examples, a payer is able to select from a among a number of payment accounts and payment cards the most appropriate payment request option. Accordingly, the virtual payment card may be determined according to the payment request option by either requesting the payment network generate new virtual payment card data, or by retrieving virtual payment card data associated with the payment request option.

In a further example, the payee payment application generates an item list, the item list being indicative of at least one item associated with the payee, and provides the item list to the payer payment device. The payer payment device is responsive to the item list to, in the payer payment application, display at least some of the item list, determine user selection of an item option in accordance with user input commands, generate an item transaction request at least partially in accordance with the item option, and provide the item transaction request to the payee payment device. The payee payment application receives the item transaction request, and determines the transaction details at least partially using the item transaction request. For the purposes of these examples, reference to an "item" is not intended to be limiting and may include one or more products and/or one or more services. In this example, the payee provides a list of goods or services, from which the payer may make a selection which is then conveyed to the payee. Whilst in this example the process is conducted by client devices, it will be appreciated that in other examples this process may be manual, for example via verbal exchange, or may not be required, for example in the event the payer has predetermined an appropriate item.

In a further example, a method for use in performing a transaction between a payee and a payer may include, in a payer payment application executed by a payer client device, determining virtual payment card data indicative of a virtual payment card indicative of a payer account, determining encoded virtual payment card data by encoding the virtual payment card data at least in part using an audio encoding scheme, and transmitting an indication of the encoded virtual payment card data to the payee client device via an audio communications channel.

Figure 2:
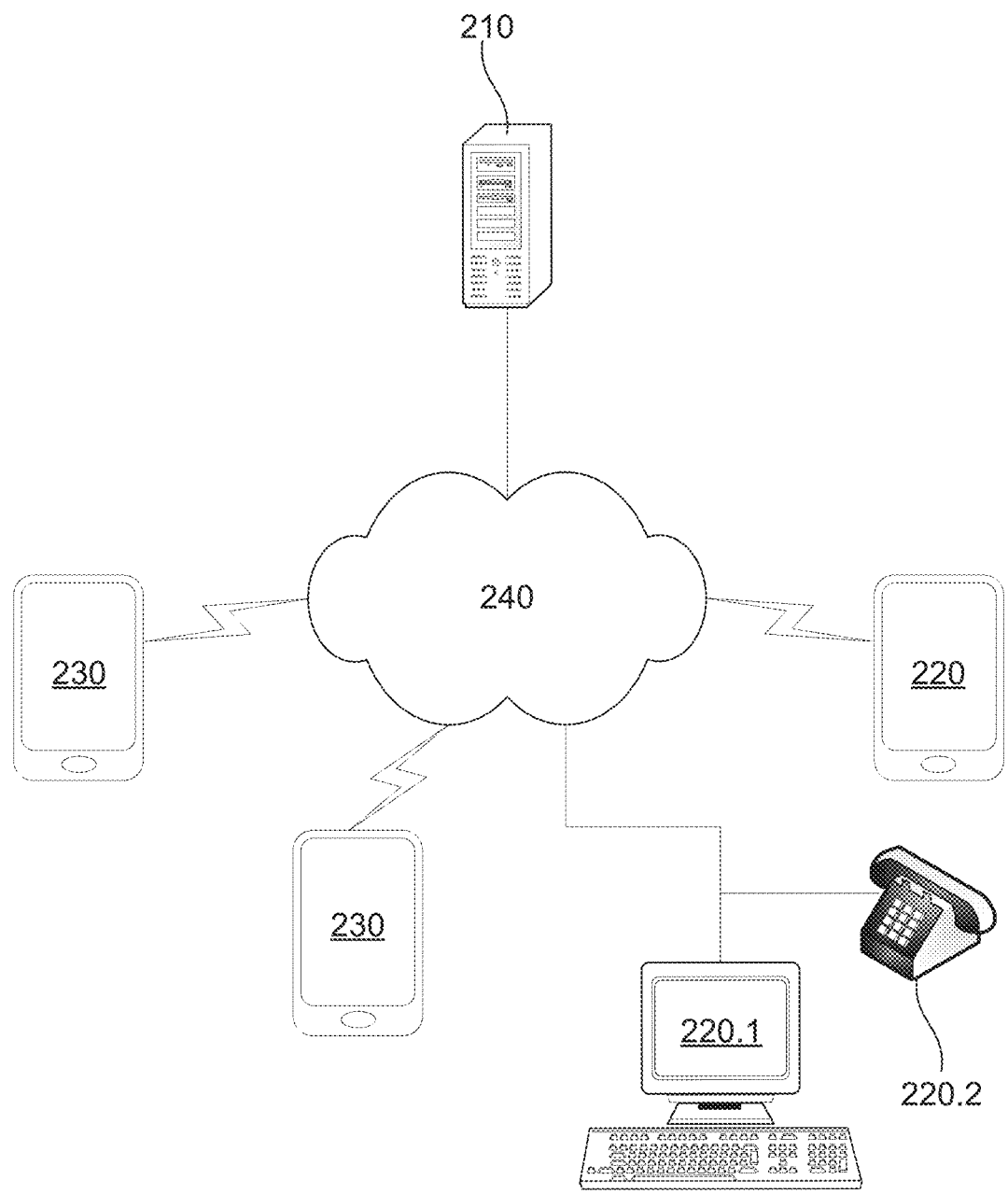
FIG. 2 is a schematic diagram of an example of a system for performing transactions.

In one example, the process is performed by one or more processing systems operating as part of a distributed architecture, an example of which will now be described with reference to FIG. 2.

In this example, a number of processing systems 210 are provided coupled to one or more payee client devices 220, and payer client devices 230, via one or more communications networks 240, such as the Internet, landline telephone network, plain old telephone service (POTS), mobile or cellular network, and/or a number of local area networks (LANs).

In some examples, the payee client device 220 (or indeed the payer client device 210) includes a processing system 220.1 and one or more telephones 220.2 such as touchtone telephones, however this is not essential as described below.

It will be appreciated that any number of processing systems 210 and similarly any number of payee client devices 220 and payer client devices 230 could be provided, and the current representation is for the purpose of illustration only. The configuration of the networks 240 is also for the purpose of example only, and in practice the processing systems 210, payee client devices 220 and payer client devices 230 can communicate via any appropriate mechanism, such as via wired or wireless connections, including, but not limited to mobile networks, private networks, such as an 802.11 networks, the Internet, LANs, WANs, or the like, as well as via direct or point-to-point connections, such as Bluetooth, or the like.

In use, the processing system 210, is adapted to be perform various data processing tasks forming part of a transaction process, and the particular functionality will vary depending on the particular requirements. For example, the processing systems can be adapted to determine transaction details, determine transaction fees, perform authentication, perform payments, or cause further payment processing devices (not shown), such as servers of financial institutions, payment gateways or the like, to perform payments, as will be appreciated by persons skilled in the art.

Whilst the processing systems 210 are shown as single entities, it will be appreciated they could include a number of processing systems distributed over a number of geographically separate locations, for example as part of a cloud based environment. Thus, the above described arrangements are not essential and other suitable configurations could be used.

Figure 3:
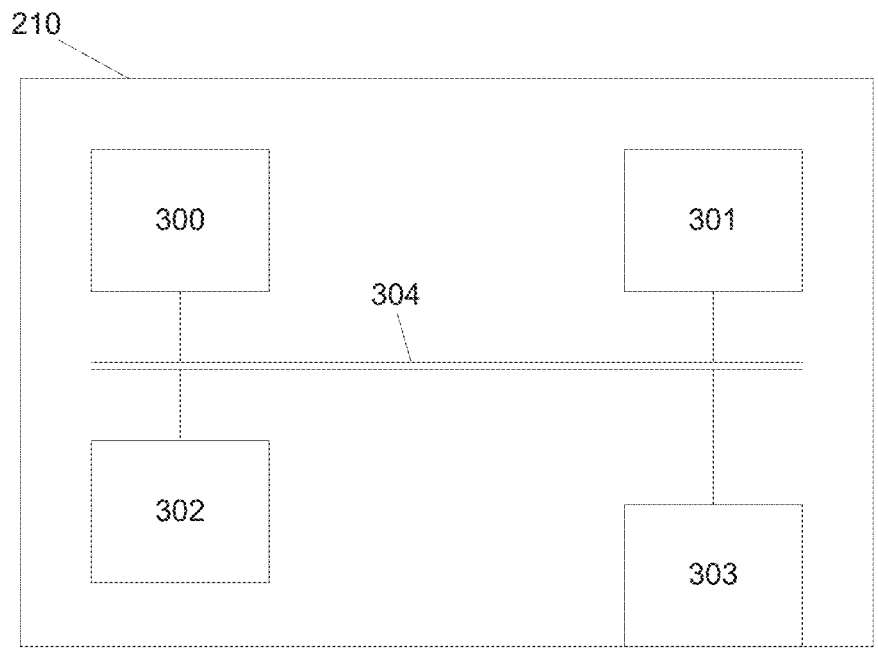
FIG. 3 is a schematic diagram of an example of a processing system.

An example of a suitable processing system 210 is shown in FIG. 3. In this example, the processing system 210 includes at least one microprocessor 300, a memory 301, an optional input/output device 302, such as a keyboard and/or display, and an external interface 303, interconnected via a bus 304 as shown. In this example the external interface 303 can be utilised for connecting the processing system 210 to peripheral devices, such as the communications networks 230, databases, other storage devices, or the like. Although a single external interface 303 is shown, this is for the purpose of example only, and in practice multiple interfaces using various methods (eg. Ethernet, serial, USB, wireless or the like) may be provided.

In use, the microprocessor 300 executes instructions in the form of applications software stored in the memory 301 to allow the required processes to be performed. The applications software may include one or more software modules, and may be executed in a suitable execution environment, such as an operating system environment, or the like.

Accordingly, it will be appreciated that the processing system 210 may be formed from any suitable processing system, such as a suitably programmed PC, web server, network server, or the like. In one particular example, the processing system 210 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

Figure 4:
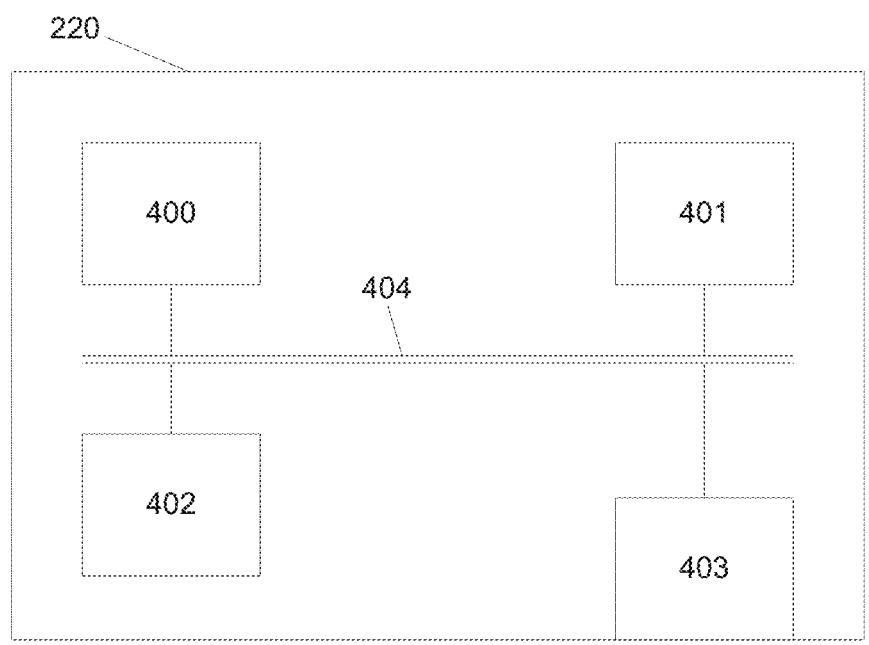
FIG. 4 is a schematic diagram of an example of a payee client device.

As shown in FIG. 4, in one example, the payee client device 220 includes at least one microprocessor 400, a memory 401, an input/output device 402, such as a keyboard and/or display, and an external interface 403, interconnected via a bus 404 as shown. In this example the external interface 403 can be utilised for connecting the payee client device 220 to peripheral devices, such as the communications networks 230 databases, other storage devices, the telephone 220.2, or the like. Although a single external interface 403 is shown, this is for the purpose of example only, and in practice multiple interfaces using various methods (eg. Ethernet, serial, USB, wireless, telephone, POTS, or the like) may be provided.

In use, the microprocessor 400 executes instructions in the form of applications software stored in the memory 401, and to allow communication with one of the processing systems 210.

Accordingly, it will be appreciated that the payee client devices 220 may be formed from any suitable client device, or multiple client devices, and could include suitably programmed PCs, Internet terminal, lap-top, or hand-held PC, POS terminals, ATMs or the like, as well as a tablet, or smart phone. However, it will also be understood that the payee client devices 220 can be any electronic processing device such as a microprocessor, microchip processor, logic gate configuration, firmware optionally associated with implementing logic such as an FPGA (Field Programmable Gate Array), or any other electronic device, system or arrangement.

As discussed above, the payee client device 220 may include, or be in communication with, a telephone 220.2. Optionally, in some examples the payee client device 220, 220.1 includes a decoding processing device, for example a DTMF processing system, which monitors and optionally records signals to/from the telephone, and automatically processes the signals. Thus, the decoding processing device may automatically decode encoded data, intentionally masking results of the decoding process from a payee. Hence, the payer's payment details are not made visible to a payee, reducing the risk of fraud. Nevertheless, a decoding processing device is not essential and similar functionality may be provided in one or more other types of payee client device 220.

Figure 5:
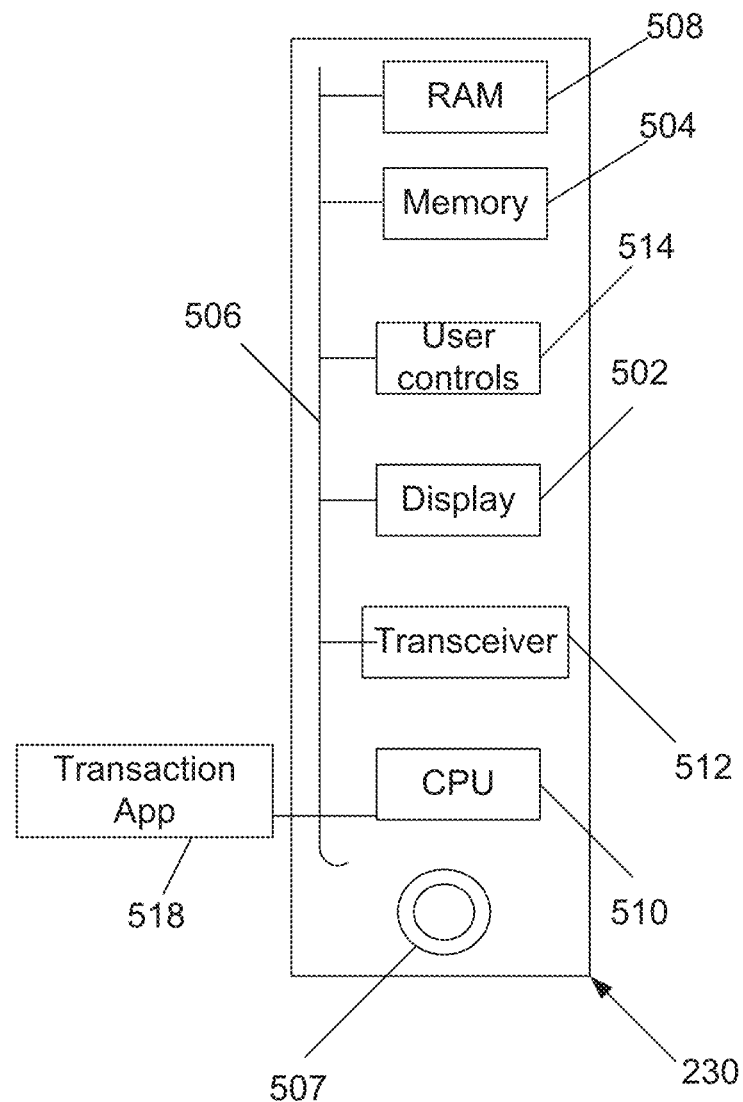
FIG. 5 is a schematic diagram of an example of a payer client device.

In one example, the payer client devices 230 is a handheld computer device such as a smart phones or a PDA such as one manufactured by Apple™, LG™, HTC™, Research In Motion™, or Motorola™. In one particular example, the payer client devices 230 includes a mobile phone or a computer such as a tablet computer. An exemplary embodiment of the payer client devices 230 is shown in FIG. 5. As shown, the payer client devices 230 includes the following components in electronic communication via a bus 506:

1. a display 502;
2. non-volatile memory 504;
3. random access memory ("RAM") 508;
4. N processing components 510;
5. a transceiver component 512 that includes N transceivers;
6. user controls 514;
7. microphone/speaker 507.

Although the components depicted in FIG. 5 represent physical components, FIG. 5 is not intended to be a hardware diagram; thus many of the components depicted in FIG. 5 may be realized by common constructs or distributed among additional physical components. Moreover, it is certainly contemplated that other existing and yet-to-be developed physical components and architectures may be utilized to implement the functional components described with reference to FIG. 5.

The display 502 generally operates to provide a presentation of content to a user, and may be realized by any of a variety of displays (e.g., CRT, LCD, HDMI, micro-projector and OLED displays). And in general, the non-volatile memory 504 functions to store (e.g., persistently store) data and executable code including code that is associated with the functional components of a browser component and a transaction App 518. In some embodiments, for example, the non-volatile memory 504 includes bootloader code, modem software, operating system code, file system code, and code to facilitate the implementation of one or more portions of the transaction App 518 as well as other components well known to those of ordinary skill in the art that are not depicted for simplicity.

In many implementations, the non-volatile memory 504 is realized by flash memory (e.g., NAND or ONENAND memory), but it is certainly contemplated that other memory types may be utilized as well. Although it may be possible to execute the code from the non-volatile memory 504, the executable code in the non-volatile memory 504 is typically loaded into RAM 508 and executed by one or more of the N processing components 510.

The N processing components 510 in connection with RAM 508 generally operate to execute the instructions stored in non-volatile memory 504 to effectuate the functional components. As one of ordinarily skill in the art will appreciate, the N processing components 510 may include a video processor, modem processor, DSP, graphics processing unit (GPU), and other processing components.

The transceiver component 512 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

Accordingly, it will be appreciated that the payer client devices 230 be formed from any suitably programmed processing system and could include suitably programmed PCs, Internet terminal, lap-top, or hand-held PC, a tablet, a smart phone, or the like. However, it will also be understood that the payer client devices 230 can be any electronic processing device such as a microprocessor, microchip processor, logic gate configuration, firmware optionally associated with implementing logic such as an FPGA (Field Programmable Gate Array), or any other electronic device, system or arrangement.

Examples of the processes for performing transactions will be described in further detail below. For the purpose of these examples it is assumed that the processing systems 210 are payment servers that provide payment processing functionality, and in one example provide payment network functionality including communicating with acquirers or issuers as required in order to perform transactions. The payment servers 210 typically execute processing device software, allowing relevant actions to be performed, with actions performed by the payment server 210 being performed by the processor 300 in accordance with instructions stored as applications software in the memory 301 and/or input commands received from a user via the I/O device 302. It will also be assumed that actions performed by the payee client device 220, are performed by the processor 400 in accordance with instructions stored as applications software in the memory 401 and/or input commands received from a user via the I/O device 402, whilst actions performed by the payer client devices 230 are performed by the processor 510 in accordance with instructions stored as applications software in the memory 504 and/or input commands received from a user via the user controls 514.

However, it will be appreciated that the above described configuration assumed for the purpose of the following examples is not essential, and numerous other configurations may be used. It will also be appreciated that the partitioning of functionality between the different processing systems may vary, depending on the particular implementation.

Figure 6:
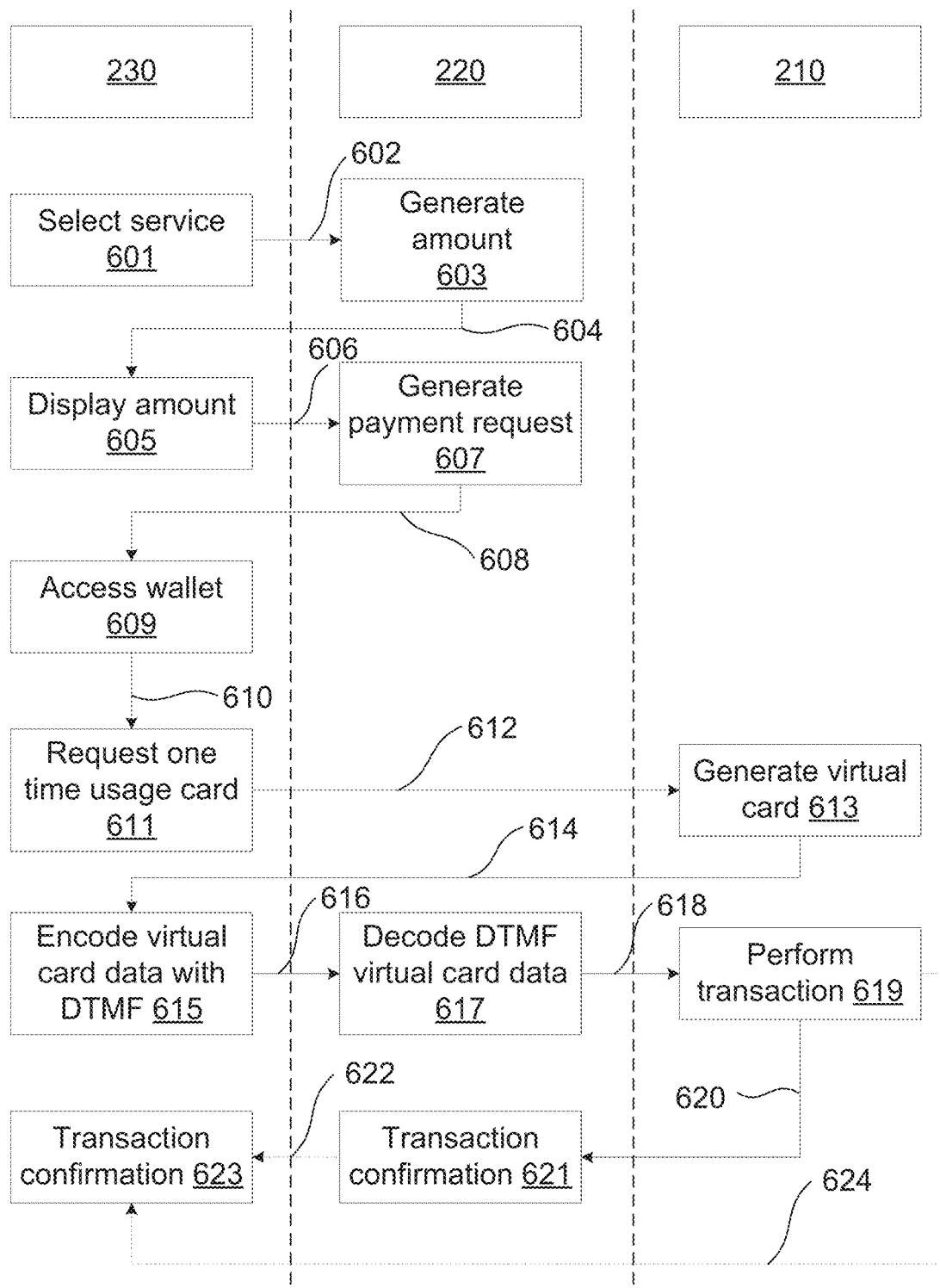
FIG. 6 is a dataflow diagram of an example of a method for performing transactions.

A specific example of a method for performing a transaction will now be described. In this example, dataflow between the payer client device 230, payee client device 220 and one or more payment processing systems 210 is shown with reference to FIGS. 6A and 6B. Reference to the payee or payer payment devices 220, 230 could also include reference to the payee or payer payment applications executed on the respective devices, and accordingly is not intended to be limiting. Moreover, whilst in this example steps are referred to as being conducted by the payee or payer client devices 220, 230, it will be appreciated that in some examples one or more steps may be performed manually by the payee or payer, for example using verbal communication, as discussed in other examples herein.

In particular, at 601 a service or item is selected using the payee client device 230, for example, by determining user selection in accordance with user input commands. The payee mobile application generates an item transaction request 602 which is communicated to the payee payment device 220, the item transaction request 602 including an indication of the selected item.

The payee client device 220 determines the transaction amount payable according the item selection at 603, and generates a transaction details notification 604, including the transaction amount, which is communicated to the payer client device 630 for display at 605.

Provided the payer indicates their acceptance using input commands, a transaction amount acceptance 606 is communicated to the payee client device 220. The payee client device subsequently generates a payer transaction request 608 at 607 and communicates this to the payer client device 609. Typically the payer transaction request 608 includes either transaction identify or reference, or an indication of the payee's identity, as well as other optional information such as the transaction amount, and the like.

The payer client device 230 access a digital wallet application at 609, for example, to enable to the payer to select, using user input commands, an account or payment card to be debited. This can be achieved, for example, by displaying a list of available accounts and payment cards to the payer using a payer display associated with the payer client device 230. At 611 the payer client device 230 uses the payment selection 610 to generate a virtual payment card request at 611.

The virtual payment card request 612 is communicated to the one or more payment processing devices 210. In this regard, the payment processing devices 210 typically include a payment network capable of generating a virtual payment card indicative of the payment selection and providing virtual payment card data 614 indicative of the virtual payment card to the payer payment device 230. Typically the virtual payment card is valid for a single transaction, however this is not essential.

Upon receipt of the virtual payment card data, the payer client device 230 encodes the virtual payment card data at 615 using an audio encoding scheme, for example, DTMF and transmits the encoded virtual payment card data 616 to the payee payment device 220 via an audio communication channel, such as one or more telephone network(s).

The payee payment device 220 decodes the DTMF encoded virtual payment card data at 617. The payee payment device 220 generates a payment transaction request 618 including the transaction amount, the decoded virtual payment card data, and an indication of the payee's identity (or the identity of the payee's account).

The payment network 210 performs the transaction at 619, including causing the payer account associated with the virtual payment card to be debited by the transaction amount, and causing the payee account to be credited by the transaction amount.

A transaction payment notification 620 which indicates whether the transaction was ultimately successful is then generated by the payment network 210 and sent to the payee client device 220 at 621, and optionally relayed to the payer client device 622 and/or directly communicated 624 to the payer client device 230 from the payment network 210.

In any event, the payee client device 220 displays an indication of the transaction payment notification at 621, for example, using a display associated with the payee client device 220. Additionally, an indication of the transaction payment notification may also be displayed at 623 by the payer client device 230.

Figure 7A:
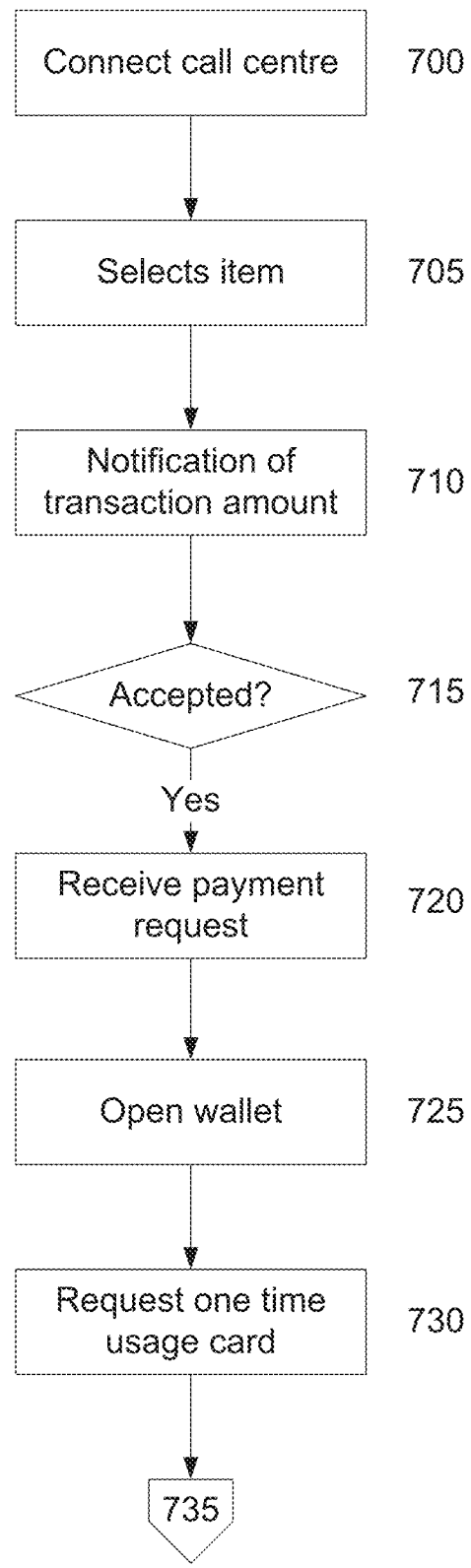
FIGS. 7A and 7B are a flowchart of a further example of a method for performing transactions; and, FIG. 8 is a flowchart of a further example of a method for performing transactions.
Figure 7B:
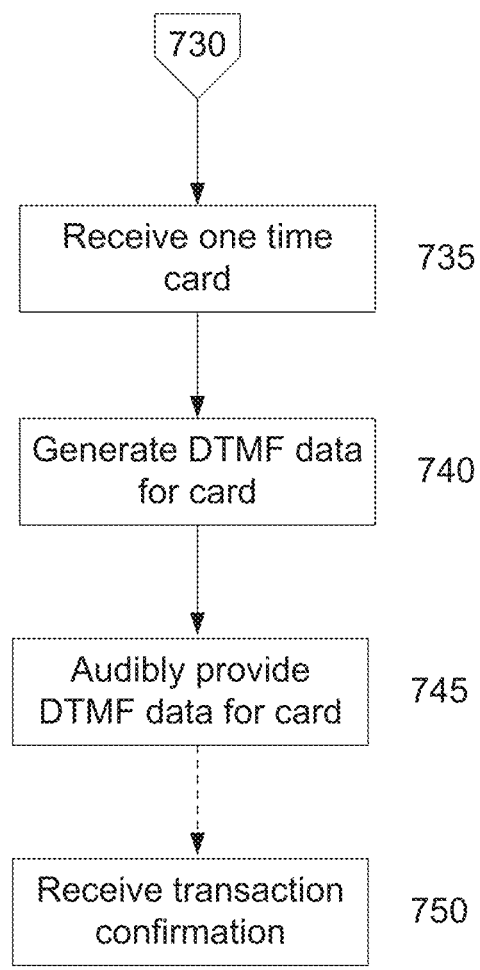

A specific example of a method for performing a transaction will now be described with reference to FIGS. 7A and 7B.

In this example the payer includes a consumer utilising a mobile payment application executed on a smartphone as the payer client device. Additionally, the payee includes a merchant, and more typically, a call centre operator associated with the merchant. However, this arrangement is not intended to be limiting, and any other suitable arrangement of payer and payee payment applications and client devices could be used.

In this example, at step 700, a consumer connects with a merchant's call centre, for example, using a mobile (also referred to a cellular) and/or landline telephone. At step 705, the consumer may select one or more items either verbally over the telephone, or via the mobile application executed on the consumer's device. Typically the items are goods/services the consumer wishes to purchase, bills to be settled, bookings or reservations for future services, or the like.

The consumer is then made aware, at step 710, of the charges for the selected item(s), also referred to as a transaction amount, either verbally over the telephone, or via communication between a merchant client device and the consumer's mobile application.

At step 715, the consumer indicates their acceptance which is communicated to the merchant, either verbally over the telephone or via user input commands interpreted by the mobile application executed on their smartphone.

In the event the consumer accepts, the consumer receives from the merchant a payer payment request at step 720. Typically, this request is received via the mobile application operated on the consumer's smartphone. However, in other instances the request may be a manual request, for example, the merchant's call centre operator verbally requesting that the consumer now provide payment details in respect of the agreed upon transaction amount.

It will be appreciated that where steps 700 to 720 have been performed manually, namely by verbal discussion between the consumer and merchant, these steps may have been performed with either a landline telephone and/or mobile/cellular telephone.

At step 725, the consumer opens a digital wallet application on their smartphone. In some examples, the digital wallet application is distinct from the mobile application operating on the consumer's smartphone, however in other examples the digital wallet application may include the mobile application or vice versa.

The digital wallet application, at step 730, generates a virtual payment card request for a virtual payment card data indicative of a virtual payment card. In this regard, the virtual payment card typically includes a limited validity, for example, is only valid for a single transaction. Using a virtual payment card in this manner decreases the risk of fraudulent activity on the consumer's account, as even in the event the virtual payment card details are obtained by a third party, they are unusable outside of the initial transaction.

Step 730 may be performed in response to user input commands, for example, a consumer selecting a particular account or payment card to be debited in accordance with the transaction. Alternatively, this step may be performed automatically in response to step 725. Moreover, the virtual payment card request includes at least an indication of the consumer's identity and more typically includes an indication of the consumer's account to be debited.

Typically, the request is provided to one or more payment processing devices, which in this example, include a payment network including issuers and acquirers, as known in the art.

At step 735, the digital wallet application receives virtual payment card data indicative of the virtual payment card from the payment network, and subsequently at step 740 encodes the virtual payment card data using DTMF. The consumer's smartphone then transmits an indication of the encoded virtual payment card data to the merchant via the telephone network at step 745.

The encoded virtual payment card data may be received by the merchant either directly via the payee payment application, or by monitoring or recording signals received by a telephone, such as a landline or mobile, or telephone network which are then provided to the merchant's computer system. The merchant decodes the DTMF virtual payment card data, typically utilising known DTMF decoding methods, and requests the payment network perform the transaction using the decoded virtual payment card data, transaction amount, and an indicator of the merchant's account details.

The payment network typically provides confirmation indicating whether the transaction is successful, and this is communicated to the consumer at step 750, either directly from the payment network, via the merchant payment application or verbally by the merchant.

Advantageously, automating the communication of the encoded payment details increases security, improves the consumer experience as the details do not have to be keyed in, decreases call time, and decreases errors typically realised in transcribing payment details.

Figure 8:
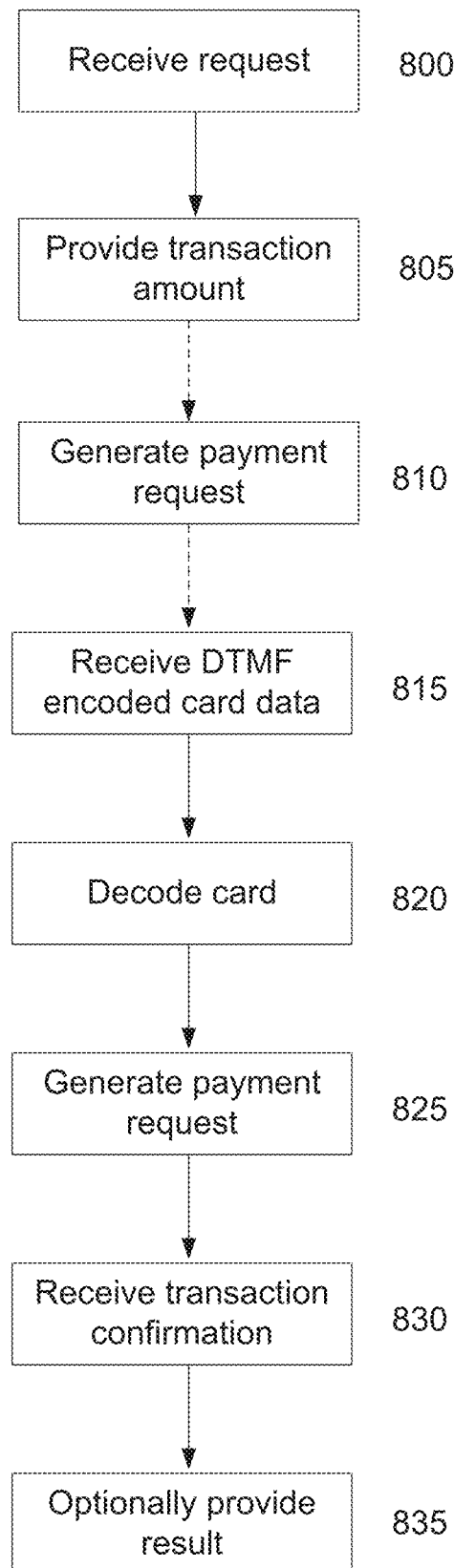

A further example of a method for performing a transaction will now be described with reference to FIG. 8.

In this example the payee includes a merchant or call centre operator, using a payee client device, such as one or more processing systems associated with a telephone. Typically, the computer system is configured to monitor signals communicated to/from the telephone, as will become apparent. However, this arrangement is not intended to be limiting, and any other suitable arrangement of payer and payee payment applications and client devices could be used.

At step 800, the merchant receives a request regarding cost of a particular item, or to provide a list of items and corresponding cost. Typically, this request is received via a call initiated between a consumer and the call centre operator.

At step 805, the merchant provides the consumer with a transaction amount indicative of the cost of the item(s), either verbally over the telephone or via communication from a payee payment application operating on the merchant's processing system.

The consumer may choose to accept or decline the transaction based upon, for example, the transaction amount. If the consumer accepts and wishes to proceed with the transaction, this will be communicated to the merchant either verbally or via communication to the payee payment application.

The merchant responds to acceptance by, at step 810, generating a payer payment request. This request may include a verbal request by the merchant for the consumer to provide, over the telephone, their payment details. Alternatively, the request may be generated by the payee payment application and communicated via the Internet to the consumer via a consumer device, such as a smartphone. Additionally or alternatively, the call centre operator toggles on a DTMF processing system at this step, whereby the merchant's DTMF processing system monitors signals communicated to/from the merchant's telephone.

At step 815, the merchant receives the consumer's payment card details which are DTMF encoded and communicated via an audio communication channel. In this particular example, the DTMF encoded card data is received by the DTMF processing system monitoring the telephone. Moreover, the payment card data may be indicative of a virtual payment card, as discussed above.

At step 820, the DTMF encoded card data is decoded by the DTMF system. This is achieved in any suitable manner, and typically includes using a known DTMF decoding algorithm, such as the Goertzel algorithm. Moreover, the results of this step are typically masked from the call centre operator, such that the decoded card data is not displayed to the operator in order to reduce the risk of fraud.

A payment transaction request is then generated at step 825 by the DTMF system, which in this example includes the decoded consumer card data, the transaction amount and an identifier indicative of the merchant's identity or account. This is communicated to one or more payment processing systems, such as discussed in any of the examples above, and more typically to a payment network, which performs the transaction according to known methods.

At step 830, confirmation of whether the transaction has been successful is received by the merchant processing system from the payment network. The confirmation notification may then be optionally relayed at step 835 by the merchant to the consumer, for example verbally over the telephone or communicated using the processing system.

Accordingly, the above examples provide a method for performing a transaction, for example, over a telephone in which payment details are automatically secured using an audio encoding scheme. Thus, payment details are protected from third parties who may seek to fraudulently use them, and are automatically provided, minimising error and saving the payer time spent keying-in details.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described. Thus, for example, it will be appreciated that features from different examples above may be used interchangeably where appropriate.

The claims defining the invention are as follows:

1. A system for performing a transaction between a payer and a payee, the system including a payee client device, a payer client device, and one or more payment processing devices, wherein
   a) a payer payment application executed by the payer client device is configured to:
      i) determine virtual payment card data indicative of a virtual payment card indicative of a payer account;
      ii) determine encoded virtual payment card data by encoding the virtual payment card data at least in part using an audio encoding scheme; and,
      iii) transmit an indication of the encoded virtual payment card data to the payee client device via an audio communications channel; and,
   b) a payee payment application executed by the payee client device is configured to:
      i) cause decoding of the encoded virtual payment card data to determine decoded virtual payment card data; and,
      ii) cause the one or more payment processing devices to selectively perform the transaction using the payer account at least partially in accordance with the decoded virtual payment card data.

2. A system according to claim 1, wherein the virtual payment card data is encoded as a sequence of tones.

3. A system according to claim 2, wherein the audio encoding scheme comprises dual tone multi-frequency signalling (DTMF), audio frequency shift keying (AFSK), or combinations thereof.

4. A system according to claim 1, wherein the payer payment application includes a digital wallet application.

5. A system according to claim 1, wherein determining virtual payment card data includes any one of:
   a) requesting the virtual payment card from the one or more payment processing devices;
   b) retrieving the virtual payment card from a store; and,
   c) generating the virtual payment card in accordance with user input commands.

6. A system according to claim 1, wherein determining virtual payment card data includes, in the payer payment application:
   a) generating a virtual payment card request, the virtual payment card request being indicative of at least one of:
      i) an identity of the payer; and,
      ii) an identity of the payer account; and,
   b) providing the virtual payment card request to the one or more payment processing devices via a communication network, the one or more payment processing devices being responsive to the virtual payment card request to:
      i) generate the virtual payment card data in accordance with the virtual payment card request; and,
      ii) provide an indication of the virtual payment card data to the payer payment application via the communication network.

7. A system according to claim 1, wherein the virtual payment card is valid at least one of:
   a) a single transaction;
   b) a predetermined transaction amount;
   c) the transaction amount;
   d) a predetermined number of transactions;
   e) a predetermined period of time; and,
   f) a period ending at a predetermined date/time.

8. A system according to claim 1, wherein causing decoding of the encoded virtual payment card data includes any one of:
   a) in a payee payment application, decoding the encoded virtual payment card data; and,
   b) causing the one or more payment processing devices to decode the encoded virtual payment card data.

9. A system according to claim 1, wherein the payee payment application is configured to:
   a) generate a payment transaction request, the payment transaction request including:
      i) an indication of the decoded virtual payment card data, the decoded virtual payment card data being indicative of at least the payer account;
      ii) a transaction amount; and,
      iii) a payee identifier indicative of a payee account; and,
   b) provide the payment transaction request to the one or more payment processing devices via a communication network, the one or more payment processing devices being responsive to the payment transaction request to:
      i) cause the payer account to be debited in accordance with the payment transaction request;
      ii) cause the payee account to be credited in accordance with the payment transaction request;
      iii) generate a transaction payment notification indicative of the results of the transaction; and,
      iv) provide the transaction payment notification to at least one of the payer payment application and the payee payment application.

10. A system according to claim 1, wherein the payee payment application displays an indication of the results of the transaction via a payee display associated with the payee client device.

11. A system according to claim 1, wherein the payer payment application displays an indication of the results of the transaction via a payer display associated with the payer client device.

12. A system according to claim 1, wherein the payee and payer client devices communicate to determine transaction details including at least a transaction amount.

13. A system according to claim 1, wherein the payee payment application is configured to:
   a) generate a payer transaction request, the payer transaction request being indicative of payer transaction details including at least one of:
      i) a transaction identity;
      ii) a transaction reference; and,
      iii) a payee identity;
   b) provide the payer transaction request to the payer payment application via a communication network, the payer payment application being responsive to:
      i) display a payment request indication indicative of at least some of the payer transaction details;
      ii) determine user selection of a payment request option in accordance with user input commands; and,
      iii) determine the virtual payment card in accordance with the payment request option.

14. A system according to claim 1, wherein the payee payment application is configured to:
   a) generate an item list, the item list being indicative of at least one item associated with the payee;
   b) provide the item list to the payer payment device, the payer payment device being responsive to the item list to, in the payer payment application:
      i) display at least some of the item list;
      ii) determine user selection of an item option in accordance with user input commands;
      iii) generate an item transaction request at least partially in accordance with the item option; and,
      iv) provide the item transaction request to the payee payment device; and,
   c) receive the item transaction request; and,
   d) determine the transaction details at least partially using the item transaction request.

15. A system according to claim 14, wherein the item includes at least one of goods and services.

16. A method for performing a transaction between a payer and a payee, the method including, in a system including a payee client device, a payer client device and one or more payment processing devices:
   a) in a payer payment application executed by the payer client device:
      i) determining virtual payment card data indicative of a virtual payment card indicative of a payer account;
      ii) determining encoded virtual payment card data by encoding the virtual payment card data at least in part using an audio encoding scheme; and,
      iii) transmitting an indication of the encoded virtual payment card data to the payee client device via an audio communications channel; and,
   b) in a payee payment application executed by the payee client device:
      i) causing decoding of the encoded virtual payment card data to determine decoded virtual payment card data; and, ii) causing the one or more payment processing devices to selectively perform the transaction using the payer account at least partially in accordance with the decoded virtual payment card data.

\* \* \* \* \*